(12) United States Patent
Borcherding et al.

(10) Patent No.: US 6,257,767 B1
(45) Date of Patent: Jul. 10, 2001

(54) REDUCED COST BEARING RETAINER

(75) Inventors: Gary W. Borcherding, Florissant, MO (US); Jeffrey K. Leicht, Cleveland, WI (US)

(73) Assignee: Emerson Electric Co., St. Louis, MO (US)

(*) Notice: Subject to any disclaimer, the term of this patent is extended or adjusted under 35 U.S.C. 154(b) by 0 days.

(21) Appl. No.: 09/384,142

(22) Filed: Aug. 27, 1999

(51) Int. Cl.[7] .................................................. F16C 23/04
(52) U.S. Cl. ........................................... 384/209; 384/207
(58) Field of Search ...................................... 384/209, 210, 384/208, 207, 206

(56) References Cited

U.S. PATENT DOCUMENTS 4,910,424  3/1990  Borcherding .
4,920,289 * 4/1990  Saito ................................ 384/210

* cited by examiner

Primary Examiner—Lenard A. Footland
(74) Attorney, Agent, or Firm—Howell & Haferkamp, LC

(57) ABSTRACT

A bearing retainer that holds a bearing in a bearing seat of an electromagnetic device has a unique construction that reduces its cost of manufacture. The bearing retainer has a peripheral edge with a plurality of radially extending tabs centered in gaps in the peripheral edge. The tabs connect with tabs of adjacent bearing retainers, allowing a plurality of interconnected bearing retainers to be nested on a steel sheet from which the retainers are stamped, thereby optimizing material use and reducing costs. The bearing retainers are composed of martensite which eliminates a heat tempering process required of prior art retainers and further reduces costs.

20 Claims, 2 Drawing Sheets

REDUCED COST BEARING RETAINER

BACKGROUND OF THE INVENTION

1. Field of the Invention

The present invention pertains to a bearing retainer that holds a bearing in place in a bearing seat of an electromagnetic device where the bearing retainer has an unique construction that reduces its cost of manufacture. More specifically, the present invention pertains to a bearing retainer having a flanged shaped outer peripheral edge with a plurality of radially extending tabs centered in gaps in the peripheral edge. The flanged shape of the peripheral edge enables the retainer to be bowl/track fed in automated assembly of the retainer into a housing and the tabs connect with tabs of adjacent bearing retainers, allowing optimization of material consumption and reducing costs in the stamping process. In the preferred embodiment, the bearing retainers are composed of a pre-tempered steel, for example Martinsite®, thus eliminating a subsequent heat tempering process required of prior art retainers and further reducing the cost of manufacture.

2. Description of the Related Art

A bearing retainer is employed to retain a bearing supporting a rotating shaft of a device in a bearing seat on an enclosure end wall of the device. An example of such a bearing retainer is described in the U.S. Pat. No. 4,910,424, of Borcherding, which is assigned to the assignee of the present invention and is incorporated herein by reference.

The prior art bearing retainer disclosed in the above referenced patent is manufactured by stamping the retainer from a strip of steel. The stamped retainer has a center hole, defined by a circular inner edge of the bearing, and a circular outer perimeter. The bearing has an intermediate ring section between the inner edge and the outer perimeter of the bearing. The ring section is generally flat and is pressed flat against a mating surface or surfaces of the device enclosure end wall when inserting the retainer against a bearing positioned in the bearing seat of the end wall. The outer perimeter edge of the retainer is formed at an angle relative to the intermediate ring section of the retainer. This provides a chamfer or tapered edge around the outer perimeter of the bearing retainer that is press-fit into an annular cavity or shoulder of the device enclosure end wall to securely hold the bearing retainer in position in the end wall. A plurality of resilient fingers project radially inwardly from the inner edge of the bearing retainer into the retainer center hole. The fingers are also angled relative to the intermediate ring section of the bearing. The resilient fingers engage against the outer surface of the bearing mounted in the bearing seat of the device enclosure end wall and hold the bearing in the bearing seat.

As stated earlier, prior art bearing retainers of this type are manufactured by stamping the bearing retainer from a strip of steel. In the stamping process, the bearing retainer is cut out from the strip of steel in its final configuration and is simultaneously formed with its tapered outer edge and with the plurality of angled, resilient fingers spatially arranged around its inner edge. Subsequent to the stamping process, the bearing retainer is heat tempered to increase its strength. Although the bearing retainer of the prior art functions well for its intended purpose, it could be improved upon if its manufacturing costs are reduced.

SUMMARY OF THE INVENTION

The present invention provides a bearing retainer with a unique construction that reduces its manufacturing cost over that of prior art bearing retainers. Like the prior art bearing retainer, the bearing retainer of the invention is stamped from a strip of steel. However, the bearing retainer of the present invention is stamped from pre-tempered steel, for example Martinsite®. The use of Martinsite® in the bearing retainer of the invention provides it with sufficient strength and enables the elimination of the subsequent heat treating step required of prior art bearing retainers, thus reducing its manufacturing cost.

The stamped bearing retainer of the invention has a generally circular configuration with a center hole defined by a circular inner edge of the bearing retainer. Surrounding the inner edge of the bearing retainer is a ring portion of the retainer. The ring portion is stamped with a flat surface. Radially outwardly from the ring portion of the retainer the bearing retainer is formed with several arcuate flanges. In the preferred embodiment there are three arcuate flanges. The arcuate flanges have orientations that angle away from the planar surface of the bearing ring as they extend outwardly from the bearing ring. The three arcuate flanges define the outer perimeter of the bearing retainer. Providing the flanges on the retainer periphery enables the retainers to be bowl/track fed in automated assembly of the retainer into housings. The flanges reduce the possibility of adjacent retainers "leafing" or "shingling" over each other in the tracking of the bowl feeders. The arcuate flanges also serve to locate and center the retainer during assembly into the housing enclosure to ensure proper bearing retention.

The three arcuate flanges are separated from each other by gaps formed in the outer perimeter of the bearing retainer. The gaps are formed by pairs of notches cut into the perimeter of the bearing retainer in the stamping process and radially projecting tabs positioned between the notches of each pair. The tabs project radially outwardly from the ring portion of the bearing retainer and are preferably coplanar with the planar surface of the ring portion. The tabs function as the interconnecting tabs or trim tabs that connect adjacent bearing retainers following the stamping process and enable the nesting of the retainers diagonally across a strip of steel further reducing manufacturing costs.

As in the prior art bearing retainer, the bearing retainer of the invention is also formed with a plurality of resilient fingers that project radially inwardly toward the center of the bearing retainer center hole from the retainer inner edge. The resilient fingers have an angled orientation relative to the planar surface of the retainer ring just as in the prior art retainer.

The bearing retainer of the invention is formed with arcuate ridges that project from the inner edge of the retainer. The ridges are positioned opposite the gaps in the outer perimeter of the retainer and reinforce the retainer ring portion in the area of the gaps. The ridges have angled orientations relative to the planar surface of the retainer ring portion, and in the preferred embodiment are formed at right angles relative to the planar surface of the ring portion. The arcuate ridges are not limited to right angles. However, the right angles optimize the retainer strength and enable a maximum flow of injectable lubricant from one side of the retainer to the other. The resilient fingers and arcuate ridges are spatially arranged relative to each other around the inner edge of the bearing retainer ring.

The bearing retainer of the invention is used in the same manner as prior art bearing retainers. The bearing retainer is press-fit into an annular shoulder provided for the retainer in the enclosure end wall in which the bearing is mounted. The resilient fingers of the bearing retainer engage against a back side of the bearing and secure it firmly in the bearing seat of the enclosure end wall. The arcuate ridges on the inner edge of the bearing retainer reinforce the retainer in the area of the gaps and prevent the retainer ring portion from bending in the area of the gaps when the retainer is press-fit into the annular shoulder of the enclosure end wall. The tapered configurations of the arcuate flanges at the perimeter of the bearing retainer provide a tight friction fit of the bearing retainer in the annular shoulder of the enclosure end wall in the same manner as the circular flange of the prior art bearing retainer. However, to compensate for any reduction of the interference fit resulting from segmenting the arcuate flanges by the gaps between the flanges, the trim tabs positioned in the gaps between the flanges are formed with a minimum radial extent corresponding to that of the flanges so that distal ends of the tabs engage and bite into the annular shoulder of the enclosure end wall, thereby reinforcing the interference fit of the arcuate flanges in the annular shoulder of the end wall.

DESCRIPTION OF THE DRAWINGS

Further objects and features of the present invention are revealed in the following detailed description of the preferred embodiment of the invention and in the drawing figures, wherein.

DETAILED DESCRIPTION OF THE PREFERRED EMBODIMENT

Figure 4:
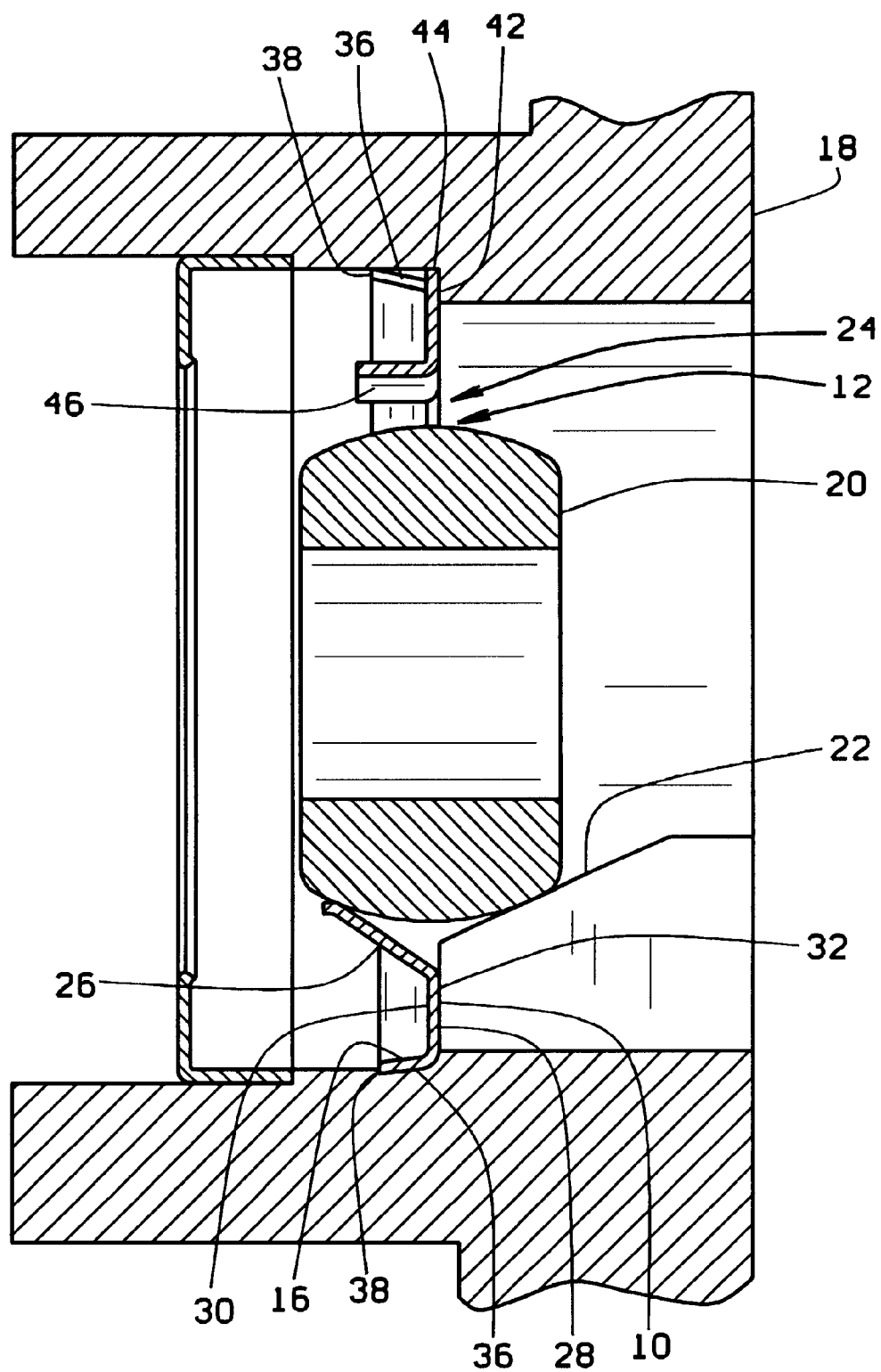
FIG. 4 is a partial, side sectioned view of the bearing retainer in one operative environment.

The bearing retainer 10 of the invention has a construction that is similar to that of the prior art bearing retainer disclosed in the earlier referenced U.S. Pat. No. 4,910,424. Like the prior art bearing retainer, the bearing retainer 10 of the invention is also stamped from sheet metal. The bearing retainer 10 is formed with a center hole 12 that is defined by a circular inner edge 14 of the retainer. The circle defined by the inner edge 14 is dimensioned slightly larger than the bearing with which the bearing retainer is to be used. This is shown in FIG. 4 where the bearing retainer is shown inserted into an annular shoulder 16 of an electromagnetic device housing end wall 18. The bearing 20, here a spherical bearing, is held against a bearing seat 22 of the end wall by the retainer 10 in a manner to be explained. Dimensioning the inner edge 14 of the bearing retainer slightly larger than the periphery of the bearing 20 provides a gap 24 between the bearing retainer inner edge 14 and the bearing 20 to allow a lubricant, such as an oil soaked wicking material, to be injected through the gap 24 from the exterior of the device enclosure (to the right in FIG. 4).

Resilient fingers 26 project radially inwardly from the inner edge 14 of the bearing retainer. The resilient fingers 26, in the preferred embodiment three resilient fingers, function to hold the bearing 20 in the bearing seat 22 in the same manner as the prior art bearing retainer described in the above-referenced patent.

Radially outside the inner edge 14, the bearing retainer has a planar ring portion 28. The ring portion 28 has opposite flat interior 30 and exterior 32 surfaces. The exterior surface 32 seats against the surfaces of the housing end wall 14 when the retainer is inserted into the annular shoulder 16 of the end wall as seen in FIG. 4.

Figure 1:
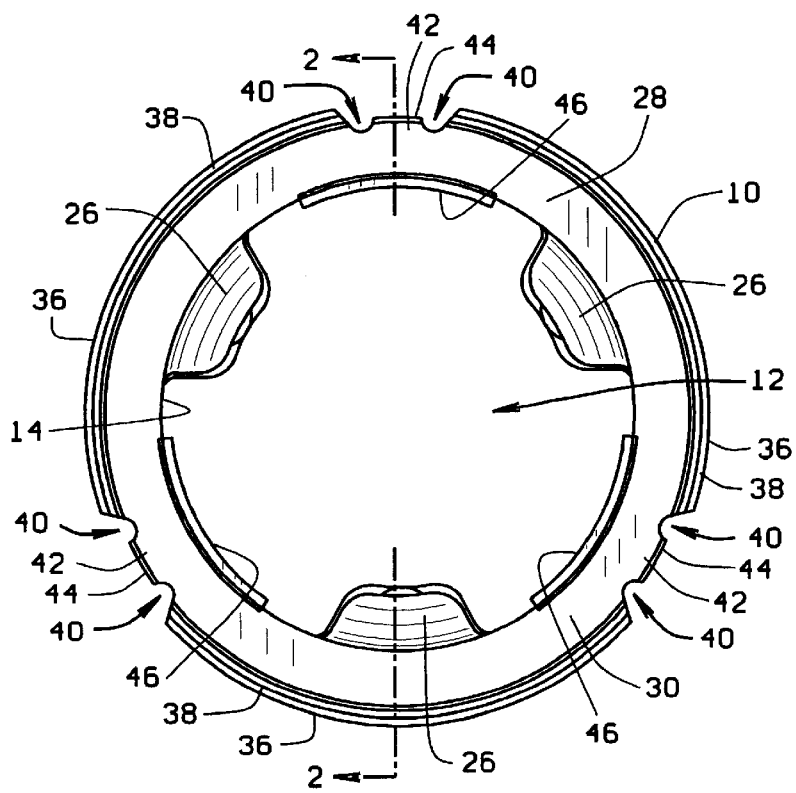
FIG. 1 is a plan view of the bearing retainer of the invention.
Figure 2:
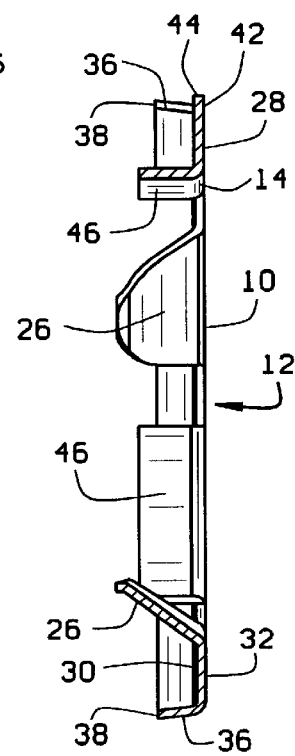
FIG. 2 is a side sectioned view of the bearing retainer of FIG. 1.
Figure 3:
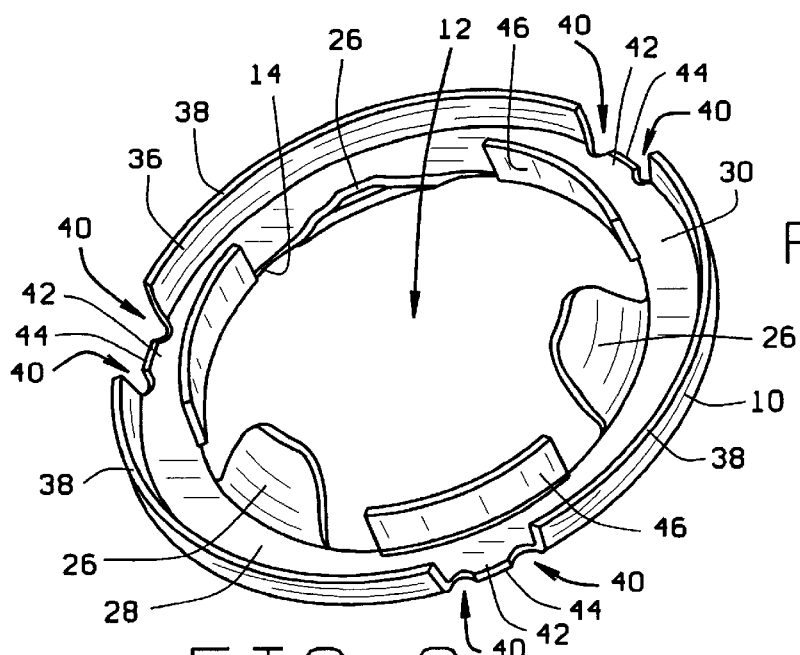
FIG. 3 is a perspective view of the bearing retainer of FIG. 1.

The construction of the bearing retainer 10 to this point is for the most part the same as that of the prior art bearing retainer disclosed in the above-referenced patent. However, the construction of the perimeter of the bearing retainer that enables it to be bowl/track fed in automated assembly processes, preventing "leafing" or "shingling" with adjacent retainers, and also provides the perimeter of the retainer with connection tabs in the stamping process enabling the retainers to be arranged diagonally across a strip of steel to optimize material consumption, distinguishes it from the prior art bearing retainer. Referring to FIGS. 1–3, the bearing retainer 10 has a perimeter defined by arcuate flanges 36. In the preferred embodiment, there are three arcuate flanges. The arcuate flanges are formed in the stamping process of the retainer and as seen in FIG. 2, are bent at an angle relative to the ring 28 of the retainer. The radial width of the ring 28 and the angled orientation of the arcuate flanges 36 allows a distal edge 38 of the flanges to dig into the material of the annular shoulder 16 in the housing end wall 18 when the retainer is inserted into the annular shoulder to securely hold the retainer in place. The arcuate flanges 36 are separated from each other around the periphery of the retainer by gaps formed by pairs of notches 40 and radially projecting tabs 42 between the notches of each pair.

The tabs 42 are formed in the perimeter of the retainer to function as a connection between adjacent retainers when they are stamped from the sheet metal. The connection provided by the tabs 42 enables optimization of material consumption and reduced cost in the stamping process. As seen in FIG. 2, the tabs 42 project radially outwardly from the ring 28 of the bearing retainer and are preferably positioned in the same plane as the ring. However, the tabs could be angled relative to the ring depending on the application. The radial extent of the tabs 42 is chosen so that distal ends 44 of the tabs will engage and dig into the material of the annular shoulder 16 of the housing end wall 18 when the retainer is inserted into the annular shoulder as shown in FIG. 4. This also securely holds the retainer in the annular shoulder.

Forming the gaps in the perimeter between the arcuate flanges 36 in order to form the tabs 42 presented the possibility of the bearing retainer bending at the gaps when the retainer is inserted into the annular shoulder 16 of the housing end wall 18. In order to resist bending of the retainer, a plurality of arcuate ridges 46 are formed in the retainer ring portion 28 at the inner edge 14. The arcuate ridges 46 are spatially arranged around the inner edge 14 of the retainer and are spaced from the resilient fingers 26. As seen in FIG. 1, each of the arcuate ridges 46 is positioned radially opposite a gap formed by the notches 40 and the tabs 42. As seen in FIG. 2, each of the ridges 46 is preferably formed at a right angle relative to the ring portion 28 of the bearing retainer. This configuration provides the maximum strengthening of the ring portion 28 in the area of the gaps formed by the notches 40 and tabs 42. However, other angle orientations of the arcuate ridges 46 relative to the ring portion 28 could be chosen. The right angle enables maximum flow of the injectable lubricant to both sides of the retainer during injection.

In a preferred embodiment of the bearing retainer 10, to further reduce the manufacturing costs of the bearing retainer it is stamped from metal composed of martensite, for example Martinsite®. Martinsite® is a registered trademark of the Inland Steel Company of Chicago, Ill. The use of Martinsite® in the stamping of the bearing retainer provides the retainer with sufficient strength and eliminates the need for a post heat tempering process that is employed in the stamping process of prior art bearing retainers. Other pretempered steels may also be used, for example bainite steel. In prior art bearing retainers, following the stamping of the retainers from sheet metal the retainers are strengthened by heat tempering. With the construction of the retainer of the invention from Martinsite®, the subsequent heat tempering step is not needed and eliminated. This further reduces the cost of manufacturing the bearing retainer of the invention.

The bearing retainer 10 is shown in use in FIG. 4 inserted into an annular shoulder 16 of a housing end wall 18. As explained earlier, the resilient fingers 26 engage against an outer surface of the bearing 20 and securely hold the bearing in the bearing seat 22. The size of the inner edge 14 of the bearing retainer provides a gap 24 between the resilient fingers 26 for the injection of a lubricant into the area behind the bearing or to the left in FIG. 4. The arcuate flanges 36 flex slightly when inserted into the annular shoulder 16 and engage with the shoulder in friction engagement. The distal ends 38 of the arcuate flanges dig into the material of the annular shoulder 16 and further secure the retainer in the shoulder. In addition, the distal ends 44 of the tabs 42 dig into the material of the annular shoulder 16 and further hold the retainer in the shoulder. The arcuate ridges 46 radially opposite the gaps in the retainer perimeter add strengthening to the retainer ring portion 28 in the areas of the gaps.

While the present invention has been described by reference to a specific embodiment, it should be understood that modifications and variations of the invention may be constructed without departing from the scope of the invention defined in the following claims.

What is claimed:

1. A bearing retainer comprising:
    a ring having a circular planar surface with an inner edge, the inner edge defining a center hole through the retainer, the ring having an outer perimeter with a plurality of tabs projecting from the ring outer perimeter, the ring as a plurality of arcuate ridges that project from the ring inner edge at an angle relative to the planar surface of the ring, and
    a plurality of arcuate flanges project from the ring outer perimeter at an angle relative to the ring planar surface and the plurality of arcuate flanges are separated from each other by a tab positioned between adjacent arcuate flanges.

2. A bearing retainer comprising:
    a ring having a circular planar surface with an inner edge, the inner edge defining a center hole through the retainer, the ring having an outer perimeter with a plurality of arcuate flanges protecting from the ring outer perimeter at an angle relative to the planar surface of the ring, the plurality of arcuate flanges being separated from each other by gaps between adjacent arcuate flanges, and
    the ring has a plurality of arcuate ridges that project from the ring inner edge at an angle relative to the planar surface of the ring.

3. The bearing retainer of claim 2, wherein:
    each arcuate ridge is positioned on an opposite side of the ring planar surface from a gap.

4. The bearing retainer of claim 3, wherein:
    the ring has opposite first and second sides and the arcuate flanges and arcuate ridges project outwardly from the first side of the ring.

5. The bearing retainer of claim 2, wherein:
    the ring has a plurality of resilient fingers that project from the ring inner edge and each resilient finger is positioned between a pair of arcuate ridges.

6. The bearing retainer of claim 5, wherein:
    the resilient fingers are spaced from the arcuate ridges.

7. The bearing retainer of claim 2, wherein:
    the ring has a plurality of tabs that project outwardly from the ring outer perimeter.

8. The bearing retainer of claim 7, wherein:
    the tabs project outwardly from the ring outer perimeter in the gaps between adjacent arcuate flanges.

9. The bearing retainer of claim 7, wherein:
    the plurality of tabs are coplanar with the ring planar surface.

10. A bearing retainer comprising:
    a ring having a circular planar surface with an inner edge, the inner edge defining a center hole through the retainer, the ring having an outer perimeter with a plurality of arcuate flanges protecting from the ring outer perimeter at an angle relative to the planar surface of the ring, the plurality of arcuate flanges being separated from each other by gaps between adjacent arcuate flanges, and
    the bearing retainer is composed of martinsite.

11. The bearing retainer of claim 10, wherein:
    the ring has a plurality of tabs that project outwardly from the ring outer perimeter.

12. The bearing retainer of claim 11, wherein:
    the tabs project outwardly from the ring outer perimeter in the gaps between adjacent arcuate flanges.

13. A bearing retainer comprising:
    a ring having a circular planar surface with an inner edge, the inner edge defining a center hole through the retainer, the ring having an outer perimeter with a plurality of tabs projecting from the ring outer perimeter, and the ring has a plurality of arcuate ridges that project from the ring, inner edge at an angle relative to the planar surface of the ring, the arcuate ridges and the tabs are equal in number and each arcuate ridge is positioned on an opposite side of the ring planar surface from a tab.

14. A bearing retainer comprising:
    a ring having a circular planar surface with an inner edge, the inner edge defining a center hole through the retainer, the ring having an outer perimeter with a plurality of tabs protecting from the ring outer perimeter, and the ring has a plurality of arcuate ridges that project from the ring inner edge at an angle relative to the planar surface of the ring, the plurality of arcuate ridges project from the ring inner edge at a right angle relative to the ring planar surface.

15. A bearing retainer comprising:
    a ring having a circular planar surface with an inner edge, the inner edge defining a center hole through the retainer, the ring having an outer perimeter with a plurality of tabs projecting from the ring outer perimeter, the ring has a plurality of arcuate ridges that project from the ring, inner edge at an angle relative to the planar surface of the ring, and the ring has a plurality of resilient fingers that project from the ring inner edge, and the resilient fingers project at an angle relative to the ring planar surface that is less than the angle of the arcuate ridges relative to the ring planar surface.

16. The bearing retainer of claim 15, wherein:
the plurality of resilient fingers are spaced from the plurality of arcuate ridges around the ring inner edge.

17. A bearing retainer comprising:
a ring having a circular planar surface with an inner edge, the inner edge defining a center hole through the retainer, the ring having an outer perimeter with a plurality of tabs projecting from the ring outer perimeter, and the ring has a plurality of arcuate ridges that project from the ring inner edge at an angle relative to the planar surface of the ring, and
the bearing retainer is composed of martinsite.

18. The bearing retainer of claim 17, wherein:
a plurality of pairs of notches are formed in the ring outer perimeter and each tab is positioned between a pair of notches.

19. The bearing retainer of claim 17, wherein:
the ring planar surface and the plurality of tabs are all coplanar.

20. A bearing retainer comprising:
a ring having a circular planar surface with an inner edge, the inner edge defining a center hole through the retainer, the ring having an outer perimeter with a plurality of tabs projecting from the ring outer perimeter, the ring has a plurality of arcuate ridges that project from the ring inner edge at an angle relative to the planar surface of the ring, and
the ring has a plurality of resilient fingers that project from the ring inner edge at an angle relative to the ring planar surface and the resilient fingers project further from the ring inner edge than do the arcuate ridges.

* * * * *